Aug. 26, 1969    G. A. MAXWELL    3,463,953
RESONANT MOTOR
Filed March 20, 1967    3 Sheets-Sheet 1

INVENTOR.
GILBERT A. MAXWELL
BY Jack M. Wiseman
ATTORNEY

Aug. 26, 1969    G. A. MAXWELL    3,463,953
RESONANT MOTOR
Filed March 20, 1967    3 Sheets-Sheet 2

INVENTOR.
GILBERT A. MAXWELL
BY Jack M. Wiseman
ATTORNEY

Aug. 26, 1969  G. A. MAXWELL  3,463,953
RESONANT MOTOR

Filed March 20, 1967  3 Sheets-Sheet 3

INVENTOR.
GILBERT A. MAXWELL
BY Jack M. Wiseman
ATTORNEY

United States Patent Office 3,463,953
Patented Aug. 26, 1969

3,463,953
RESONANT MOTOR
Gilbert A. Maxwell, 930 Di Giulio Ave.,
Santa Clara, Calif. 95050
Filed Mar. 20, 1967, Ser. No. 624,361
Int. Cl. H02k 7/10, 7/06
U.S. Cl. 310—82               7 Claims

ABSTRACT OF THE DISCLOSURE

A resonant motor employing a rotor, such as a ring or a disc. By movably supporting the rotor about an axis passing perpendicular to the plane of the rotor, the rotor can be made to oscillate with a wobble type motion. Output means having a surface brought into contact, by friction or geared surfaces, with the wobbling rotor can be given useful motion, such as rotation, which is proportional to the resonant frequency of the rotor.

---

The present invention relates in general to motors, and more particularly to a resonant motor.

An object of the present invention is to provide a resonant motor.

Another object of the present invention is to provide a motor having a resonant rotor.

Another object of the present invention is to provide a motor having a rotor which resonates with a wobble type motion to produce useful output motion.

Still another object of the present invention is to provide a constant speed resonant motor.

A further object of the present invention is to provide a resonant motor that is self-exciting.

Briefly described, these and other objects of the present invention are achieved by a resonant motor which includes a rotor which is movably mounted on supporting means. The rotor may be movably mounted in a manner which may or may not permit the rotor to rotate. In either case, the rotor is characterized as having at least a first harmonic resonant frequency at which it will oscillate with a wobble motion. Means are provided for repetitively applying power to the rotor to cause it to wobble at a predetermined resonant frequency. Output means coupled to the rotor are adapted to be rotated in response to the wobble motion of the rotor to provide useful output motion.

In accordance with another feature of this invention the rotor may be a substantially flat disk or a ring-like member.

These and other features, objects and advantages of the present invention will be readily apparent from consideration of the following detailed description taken in conjunction with the annexed drawings in which.

In accordance with the present invention, a resonant motor is obtained by utilizing a rotor, such as a ring or disk, which has fixed harmonic frequencies about a diameter. By movably supporting the rotor about an axis passing perpendicular to the plane of the rotor, the rotor can be made to oscillate with a wobble type motion at one of the harmonic resonant frequencies. Output means having a surface brought into contact, by friction or geared surfaces, with the wobbling rotor can be given useful motion, such as rotation, which is proportional to the resonant frequency of the rotor.

Figure 1:
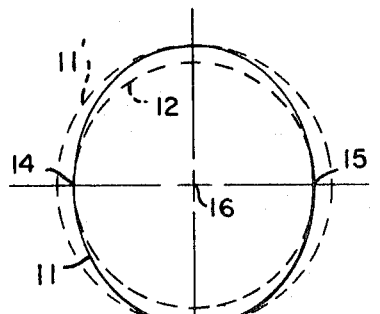
FIG. 1 is a diagrammatic top view of a wobbling disk embodied in the motor of the present invention.
Figure 1A:
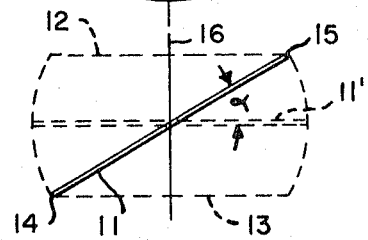
FIG. 1A is a diagrammatic side view of the wobbling disk shown in FIG. 1.

The characteristics of a resonant, wobbling, disk rotor will be clearly understood by referring to FIGS. 1 and 1A which illustrate a top view and a side view, respectively, of a wobbling disk 11 at an instant in time. The horizontal, or neutral, position of the substantially flat disk 11 is illustrated by the dotted outline 11'. An axis 16 is perpendicular to the plane defined by the disk 11 when it is in a horizontal, or neutral, position and the axis passes through the center of the disk.

As the disk 11 wobbles, its high point 15 rotates and describes a circle 12 around the axis 16. Similarly, the low point 14 of the wobbling disk 11 also rotates and describes another circle 13. The axis 16 passes through the center of each described circle 12 and 13 and is perpendicular to the plane defined by each described circle 12 and 13. The circumference of each described circle 12 and 13 is less than the circumference of the disk 11 with the difference being dependent upon the angle of contact between the disk 11 as it wobbles and the plane of the described circles 12 and 13. The plane of the described circles 12 and 13 is equal to the angle of the disk as it wobbles with respect to the plane described by the disk 11 in its horizontal, or neutral, position. The rate of rotation of the high point 15 and low point 14 of the resonant disk 11 around the axis 16 is dependent upon the angle and the frequency of oscillation. The resonant frequency of the disk 11 is dependent upon its mass moment of inertia about a diameter.

Not only will the high point 15 and low point 14 rotate to describe a circle as the disk 11 oscillates with a wobble motion, but the disk 11 itself will rotate around the axis 16. This can be illustrated by spinning a coin on a flat surface and watching the surface of the coin rotate when the coin begins to wobble.

By actuating or repeatedly applying energy to the oscillating disk 11, the friction losses associated with the wobble motion can be overcome and the disk will resonate indefinitely. The frequency of the applied energy must equal, or be a multiple of, the first harmonic resonant frequency of the disk 11 or else the disk 11 will not wobble. The energy used to sustain the wobble oscillations can be electrical, hydraulic, magnetic, and the like. For example, fluid jets can be driven by one or more fluid amplifiers to pulse the disk 11 with hydraulic energy to sustain the oscillations. As described hereinbelow in detail, switching of the energy applied to the disk can be obtained by independent switching apparatus, or the switching can be accomplished by utilizing the wobbling disk 11 as the energy switching element. The resonance sustaining energy may be applied to the top, bottom, or side of the disk 11 at any number of points or locations. One point is sufficient and the location is preferably adjacent an outer edge of the disk.

The disk has a first harmonic resonant frequency at which it will resonate. However, the disk can be resonated at some other harmonic (second, third, fourth, etc.) frequency by decreasing the frequency of the oscillation sustaining power to some integral multiple of the first harmonic frequency. Further, as is described hereinbelow, a ring, or annular member, may be used in place of the disk 11 to provide a rotor which resonates with a wobble motion.

Once resonance of a member oscillating with a wobble motion is sustained, a useful output, such as rotation of a shaft, can be obtained, in a manner as described below, to provide a motor. However, the power applied to the wobbling rotor to sustain resonance will also have to be sufficient to overcome the friction losses introduced by such an output.

Figure 2:
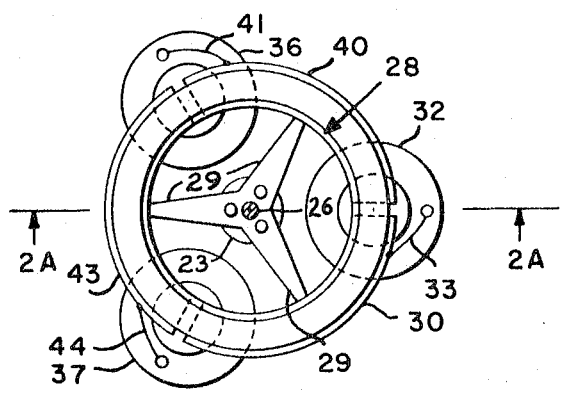
FIG. 2 is a diagrammatic top view of one embodiment of the motor of the present invention.
Figure 2A:
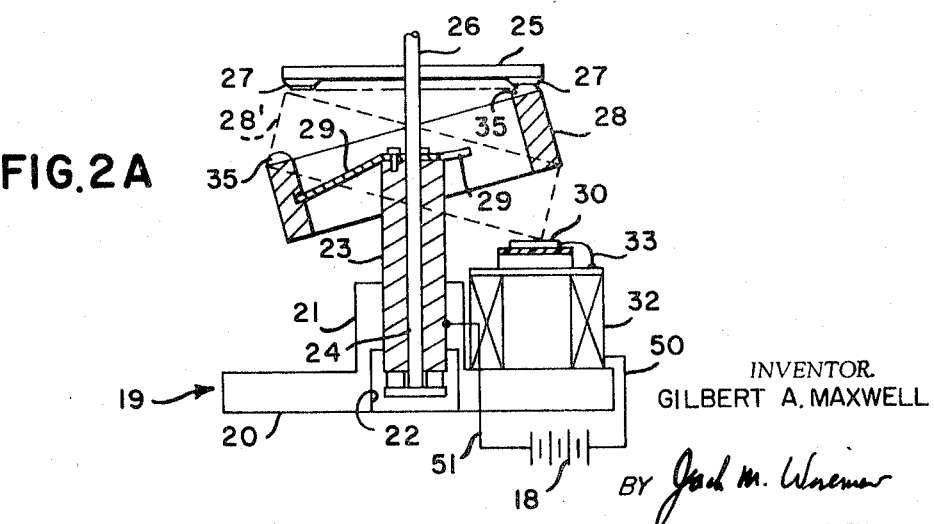
FIG. 2A is a diagrammatic vertical cross-sectional view partly in elevation of the device of FIG. 2 taken along the line 2A—2A of FIG. 2.

A resonant motor in accordance with one embodiment of the present invention which is self-excited and which utilizes a ring, or annular member, as a wobbling rotor is illustrated in FIGURES 2 and 2A as comprising a supporting member 19 of insulating material having a base portion 20. The base portion 20 includes a vertically extending portion 21 having an opening 22 therethrough. Immovably secured within the opening 22 is a hollow metallic support member 23. A metallic ring or annular member 28 is flexibly secured to the end of the support member 23 remote from the base 20 by three substantially equally spaced flexible metallic members 29. As described below, the metallic ring 28 is capable of resonating with a wobble motion. However, the metallic flexible supports 29 are adapted to prevent the ring 28 from rotating. The top surface of the ring 28, which is remote from the base 20, contains a plurality of gear teeth 35 therearound.

Rotatably secured within the metallic supporting member 23 is a shaft 24. The shaft may be caused to be rotatable with respect to the support 23 by any well-known means, such as ball bearings (not shown). The portion of the shaft 24 extending from the support 23 and remote from the base 20 includes a laterally extending plate or disk 25. A plurality of gear teeth 27 extend around the bottom of and adjacent to the periphery of the disk 25 and are adapted to be intermeshed with the gear teeth 35 on the high point of the ring 28 when the ring 28 is wobbling at a resonant frequency. There is always a minimum of a one tooth difference between the gear teeth 27 and the gear teeth 35 with the number of teeth for gear teeth 35 exceeding the number of teeth in the gear teeth 27. Extending outwardly from and perpendicular to the surface of the disk 25 is a shaft portion 26 which may be a continuation of the shaft 24. The shaft portion 26 constitutes the output shaft of the motor illustrated in FIGS. 2 and 2A and will be caused to rotate in a manner as described below.

Substantially equally spaced beneath the ring 28, and mounted on the base portion 20, are three electromagnets 32, 36 and 37. Power for energizing each of the electromagnets 32, 36 and 37, respectively, is supplied from the battery 18. However, before the voltage supplied from the battery 18 can be applied to the electromagnets 32, 36 or 37, switch contacts associated with each electromagnet must be engaged by the ring 28. Associated with the electromagnets 32, 36 and 37 are arc-shaped switch contacts 30, 40 and 43, respectively. Equally spaced under the ring 28 are the three arc-shaped switch contacts 30, 40 and 43. Each arc-shaped switch represents substantially 120 degrees. These arc-shaped contacts are spaced such that the adjacent ends of contacts 40 and 30 are positioned above the electromagnet 32, the adjacent ends of contacts 43 and 30 are positioned above the electromagnet 37, and the adjacent ends of contacts 40 and 43 are positioned above the electromagnet 36. Insulation is disposed therebetween. A lead 33 connects the contact 30 to the electromagnet 32; a lead 44 connects the contact 43 to the electromagnet 37, and a lead 41 connects the contact 40 to the electromagnet 36.

One side of the battery 18 is coupled to one side of each of the electromagnets 32, 36 and 37 by way of the lead 50 and the other side of the battery 18 is coupled to the other side of each of the electromagnets 32, 36 and 37, respectively, through a lead 51, the upright member 23, ring 28, the arc-shaped contacts 30, 40 and 43, respectively, and the leads 33, 41 and 44, respectively. The electromagnets 32, 36 and 37 are sequentially energized as the ring 28 oscillates. Each arc-shaped contact 40, 42 and 43 precedes its associated electromagnet by 120° taken in the direction of the sequential operation of the electromagnets. For example, when the ring 28 is attracted toward the electromagnet 32, the ring 28 engages arc-shaped contacts 30 and 40, the potential appearing on the ring 28 is applied by way of the contact 40 and the lead 41 to the electromagnet 36 for energizing the same. Thereupon, the ring 28 is attracted toward the electromagnet 36. Now, the ring 28 engages the adjacent ends of the contacts 40 and 43. Therefore, the ring 28 is attracted toward the electromagnet 36 and disengages the contact 30 to deenergize the electromagnet 32. The ring 28 by being in contact with the arc-shaped contact 43 causes the potential thereon to be applied to the electromagnet 37 for energizing the same by way of the lead 44. The ring 28 is thereupon drawn to the adjacent ends of the contacts 43 and 30 and also drawn away from the contact 40 to deenergize the electromagnet 36. When the ring is attracted toward the electromagnet 37, it is in contact with the arc-shaped contacts 43 and 30, and the potential appearing on the ring 28 is applied by way of the contact 30 and the lead 33, to the electromagnet 32 for energizing the same. Again the ring is drawn toward the adjacent ends of the contacts 40 and 30 and also away from the contact 43 to deenergize the electromagnet 37.

The operation of the device illustrated in FIGS. 2 and 2A is such that when the ring 28 is in its normal position, which is horizontal and such that the plane defined by the ring is perpendicular to the longitudinal axis of the shaft 24, the ring 28 presses down on all of the arc-shaped contacts 40, 43, and 30. This action causes D.C. current supplied by the battery 18 to be applied to the electromagnets 32, 36 and 37, respectively, at the same time. However, due to some inherent imbalance in the magnet fields created by the electromagnets, one electromagnet will attract the metallic ring 28 towards it, thereby being drawn away from the other two electromagnets and the portions of the arc-shaped contacts thereabove. Stated otherwise, one electromagnet will appear dominant and the ring 28 will assume a position toward the dominant electromagnet. Let us assume that the dominant electromagnet is the electromagnet 32. Because of the arc-shaped contact arrangement described above, with adjacent ends, such as the adjacent ends of the contacts 30 and 40, the next electromagnet, such as the electromagnet 36, in the direction of rotation is operated or energized to cause the ring 28 to be directed toward the electromagnet 36 which is presently energized. This switching action provides without interruption or continuously a rotating, sequentially occurring magnetic field that causes the ring 28 to oscillate with a wobble motion at its resonant frequency with the changing of the magnetic field being produced by the position of the wobbling ring 28.

The self-exciting feature of the device shown in FIGS. 2 and 2A will be better understood by assuming that, when current was applied to all of the electromagnets at the same time, the field of the electromagnet 32 was the stronger and caused the ring 28 to be pulled to its as illustrated by the dotted outline 28' in FIG. 2A. This action causes the ring 28 to be drawn away from the electromagnets 36 and 37. Now the potential appearing on the ring 28 is applied to the electromagnet 36 by way of the contact 40 and the lead 41. The electromagnet 36 is energized, which draws the ring 28 toward the electromagnet 36. Thereupon, the ring 28 is removed from the contact 30 and the electromagnet 32 is deenergized. However, the ring 28 now touches the contacts 40 and 43 and the potential on the ring 28 is applied to and energizes the electromagnet 37 by way of the contact 43 and the lead 44. Now, the ring 28 is attracted to the electromagnet 37. This action, in turn, breaks the contact between the ring 28 and the contact 40 to deenergize the electromagnet 36. The electromagnet 37, in turn, is energized, since the potential on the contact 43 and the lead 44 is applied thereto. When the electromagnet 37 is energized, the ring 28 is drawn to the adjacent ends of the contacts 30 and 43 and, also away from the contact 40 to deenergize the electromagnet 36. By the ring 28 engaging the contact 30, the electromagnet 32 is energized and the ring 28 is drawn toward the adjacent ends of the contacts 30 and 40. Also, the ring 28 is drawn away from the contact 43 to deenergize the electromagnet 37. The above-described of the ring 28 for effecting the energizing and deenergizing and deenergizing of the electromagnets 32, 36 and 37 also causes the ring 28 to oscillate with a wobble motion at its resonant frequency. As a result thereof, the device of FIGS. 2 and 2A is self-exciting.

Figure 3:
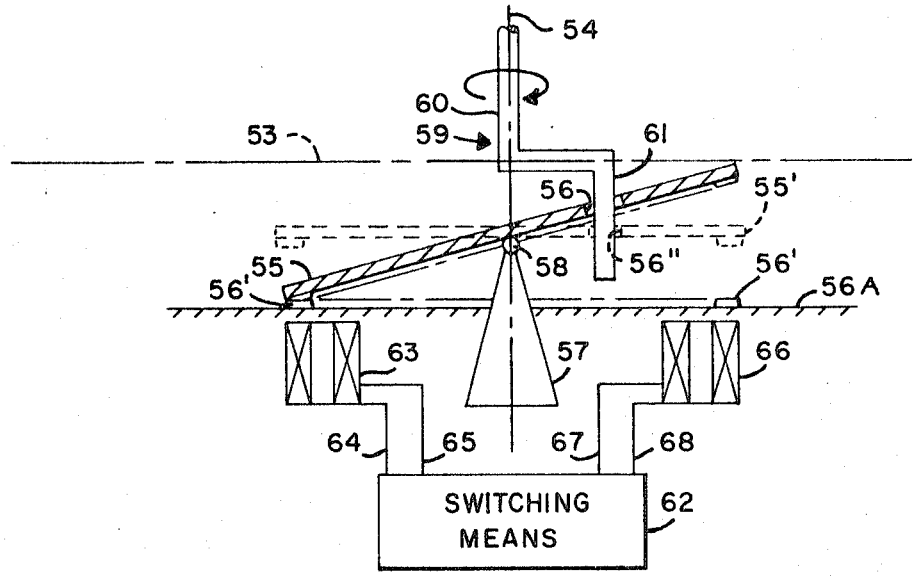
FIG. 3 is a diagrammatic cross-sectional view of still another embodiment of the motor of the present invention.

Even though the ring 28 will oscillate with a wobble motion at its resonant frequency, the flexible supports 29 which secure the ring 28 to the support member 23 will prevent the ring 28 from rotating around the shaft 24. However, as the ring 28 wobbles, its high point will rotate and describe a circle around the shaft 24. As shown by FIG. 2A, the portion of the ring 28 which becomes the rotating high point includes gear teeth 35 which, when at the high point, intermeshes with the gear teeth 27 on the bottom side of the disk 25. Accordingly, as the ring 28 wobble, the gear teeth 35 on the ring 28 being intermeshed with the gear teeth 27 on the disk 25 causes the disk 25 to rotate at a rate proportional to the resonant frequency of the wobbling ring 28. Rotation of the disk 25 causes the shaft 24 to rotate within the member 23 and also causes the shaft portion 26 to rotate around its longitudinal axis to provide useful output power and motion. Referring now to FIG. 3, there is illustrated in cross-section, another embodiment of the present invention which comprises a substantially flat, circular, metallic disk 55 with gear teeth along the lower peripheral edge thereof. The neutral, or horizontal, position of the disk is illustrated by the dotted outline 55'. A stationary member 56a with gear teeth 56' thereon mates with the gear teeth on the disk 55 for stabilizing the same. The number of teeth in the gear teeth of the disk 55 always exceeds the number of teeth in the gear teeth 56' by a minimum of one tooth difference. An axis 54 passes through the center of the disk 55 and perpendicular to the plane defined by the disk 55 when in its horizontal position. The center of the disk 55 is movably and rotatably secured to a mounting member 57 by any suitable means, such as a ball joint 58. An opening 56 in the disk 55 is adapted to receive one end of an output means 59 which includes a shaft portion 60, one end of which is coupled to a lever portion 61. The longitudinal axis of the shaft portion coincides with the axis 54 and the free end of the lever portion 61 extends through the opening 56 in the disk 55. Mounting means (not shown, but well known in the art) keep the output device 59 properly positioned and rotatable. The disk 55 is caused to oscillate with a wobble motion at one of its resonant frequencies, as described below, and its high point described a circle around the axis 54. The plane of the circle described by the high point is indicated by the dashed line 53.

Due to the coupling 58 between the disk 55 and the supporting member 56, the disk 55 also rotates around the axis 54 as it wobbles. The rotation of the disk 55 causes the lever portion 61 to rotate around the axis 54 at the same rate. As a consequence thereof, the shaft portion 60 of the output means rotates around its axis to provide useful output motion.

The disk 55 can be caused to wobble at its resonant frequency in a manner as described above in conjunction with FIGS. 2 and 2A. Alternatively, the disk may be externally excited so as to resonant by utilizing a plurality of electromagnets 63 and 66 or other energy producing devices, which are equally spaced under the disk 55. Switching means 62 alternatively supply pulses of electrical energy to the electromagnets 63 and 66 by way of leads 64, 65 and 67, 68, respectively. Although the electromagnets are energized alternately, each electromagnet is energized at a rate equal to the desired resonant frequency of the disk 55. That is, each electromagnet is energized at a rate equal to the first, second, third or other desired harmonic of the resonant frequency of the disk 55. Successively energizing the electromagnets 63 and 66 and successively deenergizing the electromagnets 63 and 66 cause the disk 55 to wobble at one of its resonant frequencies in a manner as described above.

The switching means 62 may comprise a pulse generator, the output of which is coupled to a ring counter having as many stages as there are electromagnets 63 and 66. By coupling each electromagnet to a different stage of the ring counter, each electromagnet will be successively energized in the desired sequence. Since each electromagnet is energized at a rate equal to the desired resonant frequency, the frequency of the pulse generator used as part of the switching means 62 would be equal to the desired resonant frequency multiplied by the number of electromagnets used. It is to be understood, of course, that once the disk 55 is oscillating with a wobble motion at the desired resonant frequency, resonance of the disk 55 can be sustained by a single electromagnet.

Figure 4:
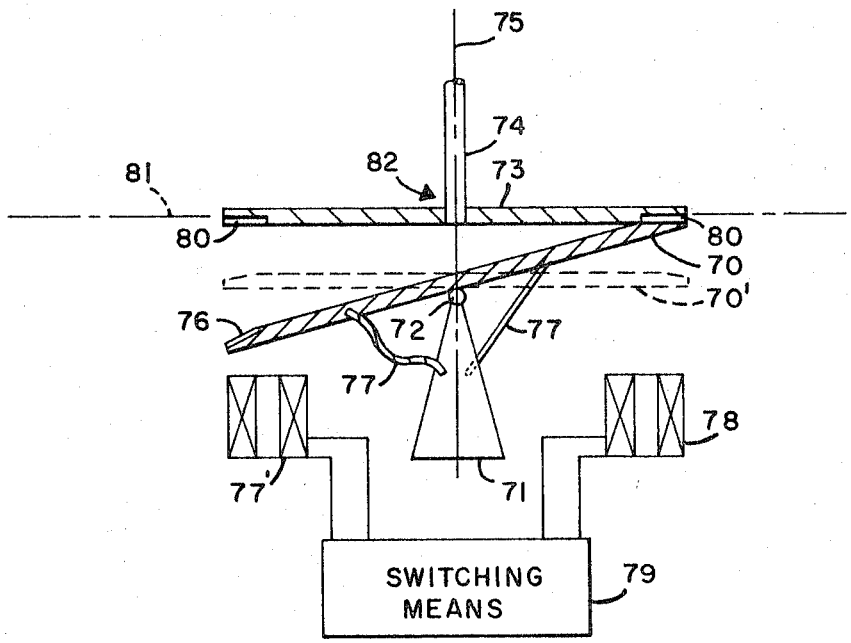
FIG. 4 is a diagrammatic cross-sectional view of a modification of the device shown in FIG. 3.

Referring now to FIG. 4, there is illustrated, in cross-section, a modification of the device shown in FIG. 3, which comprises a substantially flat, circular, metallic disk 60. The neutral or horizontal position of the disk 70 is illustrated by the dotted outline 70'. An axis 75 passes through the center of the disk 70 and is perpendicular to the plane defined by the disk 70 when the disk 70 is disposed in its horizontal position. The center of the disk 70 is movably and rotatably secured to a mounting member 71 by any suitable means, such as a ball joint 62. The outer periphery of the disk 70 is beveled as shown and contains a plurality of gear teeth 76 therearound. The ring 76 is yieldably supported by the flexible leaf spring arms 77, which prevents rotation of the ring 76 while permitting oscillation of the ring 76. The arms 77 are similar to the flexible supports 29 of FIGS. 2 and 2A.

The resonant motor of FIG. 4 includes output means 82 having a disk portion 73. The bottom peripheral surface of the disk portion 73 contains a plurality of gear teeth 80 therearound. Secured to the disk portion 73 is a shaft portion 74, the longitudinal axis of which coincides with the axis 75. Mounting means (not shown but well known in the art) keep the output device 82 properly positioned and rotatable. The disk 70 is caused to oscillate with a wobble motion at one of its resonant frequencies, in a manner as described below, and its high point describes a circle around the axis 75. The plane of the circle described by the high point is indicated by the dashed line 81. Also, the gear teeth 76 at the high point of the disk 70 are adapted to intermesh with the gear teeth 80 on the bottom periphery of the output disk 73. Because of the intermeshed gears 76 and 80 rotation of the high point around the axis 75 also causes rotation of the disk 73, which, in turn, causes rotation of the shaft portion 74 to produce useful output motion and power.

The disk 70 can be caused to wobble at its resonant frequency in a manner as described above in conjunction with FIGS. 2 and 2A. Alternatively, the disk 70 may be externally excited so as to resonate by utilizing a plurality of electromagnets 77' and 78 and switching means 79 as described above in conjunction with FIG. 3.

The embodiments of the present invention shown in FIGS. 2, 2A, 3 and 4 utilize electromagnetic energy to supply power to a wobbling rotor. However, as will be apparent to those skilled in the art, other forms of energy such as hydraulic and electrical power may be utilized to sustain and produce resonance in a wobbling rotor.

The self-excited resonant motor described above in conjunction with FIGS. 2 and 2A is particularly useful for constant speed devices, such as clocks, watches, tape recorder and record player speed control and other constant speed or timing equipment. The resonant motors described in conjunction with FIGS. 3 and 4 when externally excited, may be used in control systems to differentiate between two or more signals. For example, the electromagnets may be sequenced by an audio signal or a constant frequency switching device. Since a disk rotor will resonate at only one incoming frequency, it will be seen that if there are two different disks on the same circuit, the required control can be obtained by changing the input frequency to correspond with the desired frequency of oscillation at which the other disk rotor and associated output shaft is being driven.

What has been described is a resonant motor which utilizes a rotor which is caused to oscillate with a wobble motion at a resonant frequency to produce useful output motion.

Figure 5:
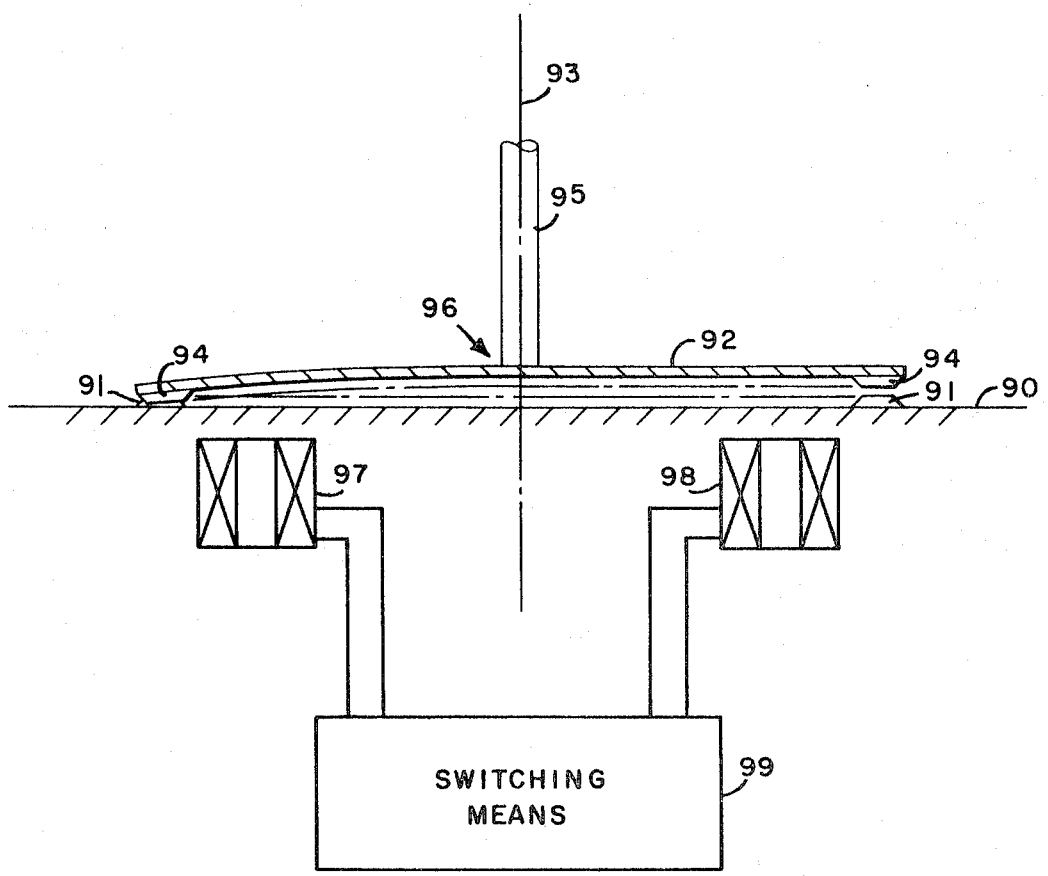
FIG. 5 is a diagrammatic vertical cross-sectional view partly in elevation of still a further embodiment of the motor of the present invention.

In FIG. 5 is illustrated a modification of the device shown in FIG. 4, which comprises a flat stationary support 90 with gear teeth 91 projecting from the upper surface thereof. Disposed above the support 90 to be supported thereby, is a flexible disk 92. An axis 93 passes through the center of the disk 92 and is perpendicular to the plane defined by the disk 92 when the disk 92 is disposed in its horizontal position. On the lower surface of the disk 92 and projecting downwardly therefrom are gear teeth 94, which mesh with the gear teeth 91. There must be at least a one tooth difference between the number of teeth in the gear teeth 91 and the number of teeth in the gear teeth 94. The center of the disk 92 is secured to an output shaft 95. The disk 92 resonates by bending as a cantilever beam about a radius or diameter.

The resonant motor of FIG. 5 includes the flexible disk 92 and the output shaft 93 as its output means 96. Mounting means, not shown, keep the output means 96 properly positioned and rotatable. The disk 92 is caused to oscillate with a yieldable motion at one of its resonant frequencies. The disk 92 can be caused to bend and yield in a cantilever beam bending action at its resonant frequency by utilizing a plurality of electromagnets 97 and 98 and switching means 99 as described above in conjunction with FIG. 3. The useful output motion and power derived from the cantilever beam bending action of the flexible disk 92 is taken off from the rotation of the shaft 95.

It is to be understood that modifications and variations of the embodiments of the invention disclosed herein may be resorted to without departing from the spirit of the invention and scope of the appended claims.

Having thus described my invention, what I claim as new and desire to protect by Letters Patent is:

1. A motor comprising a disk rotor having at least one resonant frequency at which said rotor will wobble, means for causing said rotor to wobble at a resonant frequency, and rotatable output means coupled to said rotor and adapted to be rotated in response to the wobble motion of said rotor, said rotatable output means being coupled to said disk rotor by a lever.

2. A motor according to claim 1 wherein said rotatable output means has a geared surface which is intermeshed with a geared surface on said disk rotor.

3. A motor comprising a rotor having at least one resonant frequency at which said rotor will wobble, means for causing said rotor to wobble at a resonant frequency, said rotor being formed with an annular member, and output means coupled to said annular member and adapted to be rotated in response to the wobble motion of said annular rotor, said output means includes a disk having a shaft extending from the center portion thereof, said disk having a plurality of gear teeth adjacent to the periphery thereof, said annular member having a plurality of gear teeth therearound, and said gear teeth on said disk and said annular member adapted to intermesh and cause rotation of said shaft in response to the wobble motion of said annular member.

4. A motor comprising a rotor having at least one resonant frequency at which said rotor will resonate by bending in a cantilever action, and means for causing said rotor to bend in a cantilever action at a resonant frequency.

5. A motor as claimed in claim 4 wherein said rotor includes a movably mounted, flexible disk.

6. A motor as claimed in claim 5 wherein said means for causing the rotor to bend at a resonant frequency includes means for successively applying energy to the rotor at a rate substantially equal to its resonant frequency.

7. A motor as claimed in claim 5 and comprising rotatable output means coupled to said rotor and adapted to be rotated in response to the bending motion of said rotor.

References Cited
UNITED STATES PATENTS

| | | | |
|---|---|---|---|
| 2,275,827 | 3/1942 | Plensler | 310—82 |
| 2,509,391 | 5/1950 | Hansen | 310—82 |
| 3,234,393 | 2/1966 | Ruschmann | 310—82 |
| 3,294,994 | 12/1966 | Anderson | 310—82 |

MILTON O. HIRSHFIELD, Primary Examiner

R. SKUDY, Assistant Examiner

U.S. Cl. X.R.

310—80, 83